United States Patent
Belov et al.

(10) Patent No.: US 9,096,763 B2
(45) Date of Patent: Aug. 4, 2015

(54) AQUEOUS SLURRY FOR THE PRODUCTION OF THERMAL AND ENVIRONMENTAL BARRIER COATINGS AND PROCESSES FOR MAKING AND APPLYING THE SAME

(71) Applicants: Vladimir V. Belov, Zionsville, IN (US); Irina Belov, Zionsville, IN (US)

(72) Inventors: Vladimir V. Belov, Zionsville, IN (US); Irina Belov, Zionsville, IN (US)

(73) Assignee: PRAXAIR S.T. TECHNOLOGY, INC., North Haven, CT (US)

( * ) Notice: Subject to any disclaimer, the term of this patent is extended or adjusted under 35 U.S.C. 154(b) by 0 days.

(21) Appl. No.: 13/720,571

(22) Filed: Dec. 19, 2012

(65) Prior Publication Data

US 2013/0156958 A1    Jun. 20, 2013

Related U.S. Application Data

(60) Provisional application No. 61/577,370, filed on Dec. 19, 2011.

(51) Int. Cl.
| | |
|---|---|
| *C09D 5/00* | (2006.01) |
| *C23C 24/08* | (2006.01) |
| *C23C 24/10* | (2006.01) |
| *E04B 1/78* | (2006.01) |

(52) U.S. Cl.
CPC . *C09D 5/00* (2013.01); *C23C 24/08* (2013.01); *C23C 24/085* (2013.01); *C23C 24/103* (2013.01); *E04B 1/78* (2013.01)

(58) Field of Classification Search
CPC .... C23C 24/08; C23C 24/085; C23C 24/103; E04B 1/78; C09D 5/00

USPC .......................................................... 252/62
See application file for complete search history.

(56) References Cited

U.S. PATENT DOCUMENTS

| | | |
|---|---|---|
| 5,167,988 A | 12/1992 | Yano et al. |
| 5,820,976 A | 10/1998 | Kamo |
| 5,985,368 A | 11/1999 | Sangeeta et al. |
| 6,197,424 B1 | 3/2001 | Morrison et al. |
| 6,235,370 B1 * | 5/2001 | Merrill et al. ................ 428/116 |
| 6,465,090 B1 * | 10/2002 | Stowell et al. ............... 428/325 |
| 6,641,907 B1 | 11/2003 | Merrill et al. |
| 6,703,334 B2 | 3/2004 | Belov et al. |
| 6,884,384 B2 | 4/2005 | Merrill et al. |

(Continued)

FOREIGN PATENT DOCUMENTS

| | | | |
|---|---|---|---|
| CN | 101768380 | * 12/2009 | .............. C09D 1/00 |
| EP | 1798311 A2 | 6/2007 | |
| WO | WO9310057 | * 5/1993 | .............. C04B 41/50 |

*Primary Examiner* — Shuangyi Abu Ali
(74) *Attorney, Agent, or Firm* — Nilay S. Dalal

(57) ABSTRACT

An improved slurry formulation for the production of a thermal and environmental barrier coatings are provided which can withstand high temperature applications. The slurry includes a combination of a coarse ceramic powder fraction having close porosity particles and a fine ceramic powder fraction. The combination of the two powders produces a bimodal particle size distribution having a controlled amount of closed porosity that imparts desirable properties to the coating produced. The finer solid particles are interdispersed within an aqueous binder to produce a ceramic matrix with sufficient mechanical strength. The closed porosity containing coarse particles are embedded within the resultant ceramic matrix and do not disintegrate under high temperature conditions to impart a temperature resistant, non-collapsing closed porosity to the coating which can also act as an environmental barrier.

13 Claims, 4 Drawing Sheets

(Type A)

(56) References Cited

U.S. PATENT DOCUMENTS

| | | |
|---|---|---|
| 7,648,605 B2 | 1/2010 | Merrill et al. |
| 2004/0253432 A1 | 12/2004 | Nonninger et al. |
| 2006/0019087 A1 | 1/2006 | Mazzola et al. |
| 2007/0227299 A1 * | 10/2007 | Marchiando et al. ........... 75/244 |
| 2008/0260952 A1 | 10/2008 | Xiao et al. |
| 2010/0279018 A1 | 11/2010 | Hazel et al. |
| 2010/0330282 A1 * | 12/2010 | Nienburg et al. ............. 427/292 |

\* cited by examiner

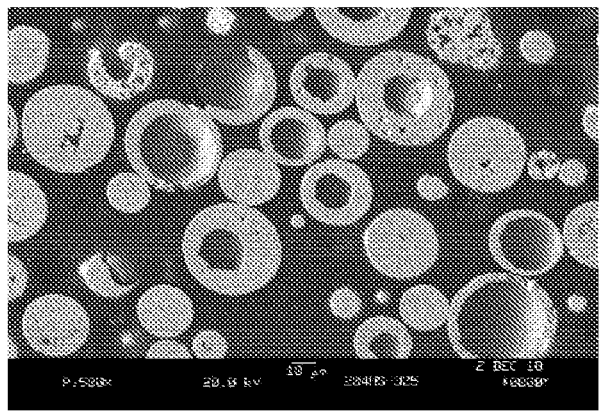
Figure 1 (Type A)
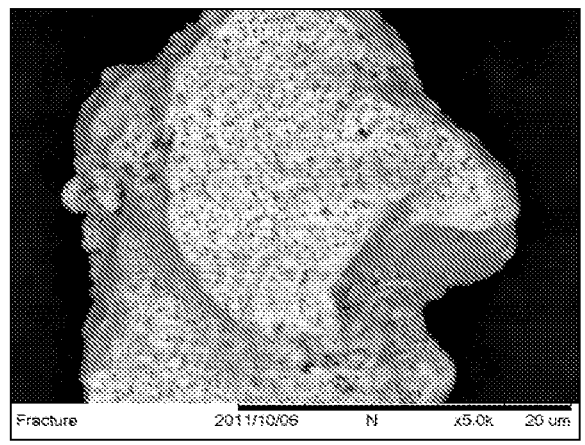
Figure 2 (Type B)

1000 C/3hrs    1100C/100 hrs    1200C/100 hrs

AQUEOUS SLURRY FOR THE PRODUCTION OF THERMAL AND ENVIRONMENTAL BARRIER COATINGS AND PROCESSES FOR MAKING AND APPLYING THE SAME

The present application claims priority from U.S. Application Ser. No. 61/577,370, filed Dec. 19, 2011, which is incorporated by reference herein in its entirety.

FIELD OF THE INVENTION

The present invention relates to an improved slurry formulation which can be used for the production of an enhanced thermal barrier coating as well as an enhanced environmental barrier coating, along with a process for the making of such aqueous slurry, and a process for applying such slurry onto a substrate.

BACKGROUND OF THE INVENTION

Extensive efforts have been undertaken for the development of thermal barrier coatings (hereafter, referred to as "TBCs") for use in various applications on metallic substrates. Various metallic substrates require thermal protection. By way of example, superalloy substrates utilized in gas turbine aircraft engines and land-based industrial gas turbines require thermal protection. Further, steel substrates for the exhaust system of internal combustion engines require thermal protection. Currently, the use of TBCs can potentially allow a reduction of metallic substrate temperatures by as much as approximately 160° C., thus increasing the lifetime of a metallic substrate by up to four times.

A typical TBC system requires a bond coat, such as overlay MCrAlY coating or diffusion aluminide, that protects the metallic substrate from oxidation and corrosion, and a top coat that reduces heat flux into the component. Top coats are invariably based on ceramic materials. Yttria-stabilized zirconia (YSZ) is frequently utilized because of its high temperature stability, low thermal conductivity and good erosion resistance. YSZ is also preferred because of the relative ease with which it can be deposited by different techniques such as thermal spraying (plasma, flame and HVOF) and electron beam physical vapor deposition (EBPVD) techniques.

TBCs applied by atmospheric plasma process (APS) are built by flattened particles of a ceramic material, and contain laminar pores and microcracks between the particles. This microstructure is an important factor contributing to the thermal barrier properties of YSZ coating because these pores and cracks can dramatically reduce the thermal conductivity of the coating as compared to the bulk material, as well as alleviate thermally induced stress and thus increase thermal shock resistance.

It is important for a TBC to preserve its low thermal conductivity throughout the life of a coated component. However, plasma-sprayed TBC layers are often in inherently thermodynamically metastable state because of the rapid quenching of the molten particles on a substrate during the spray process. Upon exposure to high service temperatures, transformation toward an equilibrium state occurs and intrinsic thermal instability of the material microstructure results in TBC sintering and porosity degradation and thus deterioration of thermal barrier properties of the coating.

EBPVD YSZ coatings have a fine columnar microstructure that is better capable of accommodating a mismatch between the thermal substrate and coating compared to plasma-sprayed layers. As a result, EBPVD TBCs are often employed in some of the most demanding and advanced applications. However EBPVD coatings are rather costly, and thus not economically viable for some applications. Further, their columnar structure provides paths for penetration of corrosive species through the coating thus decreasing corrosion resistance of the overlay.

EBPVD and Plasma spray deposition methods are line-of-sight processes that are suitable for the coating application to visible areas of a substrate. Therefore, the substrates which can be coated by these spray methods are limited to simple geometries or substrates only requiring a coating on the external features.

Slurry-based coating deposition processes may also be utilized. Slurry-based TBC coatings and their application have been investigated many times in the past already. A slurry process comprises preparing an aqueous or solvent-based slurry, applying the slurry to the substrate, drying and heat treating or sintering to obtain a coating layer. This process could be repeated to form a coating of desirable thickness. However current developments in the art still do not resolve concerns associated with slurry-derived TBC application, such as creating a coating that is sufficiently thick to provide required thermal insulation (that is more than at least 300-350 microns), as well as to prevent coating excessive shrinkage during drying and cure of the applied layers that results in coating bonding problems to the surface of a coated part and eventual coating spallation.

Sol-gel techniques are known to generally deliver good coating—substrate adhesion. However, they cannot provide practical ways to achieve a coating thickness higher than 10-50 microns that is not sufficient for thermal insulation.

In view of the several shortcomings of current TBC technology, there remains an unmet need for TBCs that can withstand high service temperatures and retain their structural integrity. As will be discussed, the inventors herein have identified the problem of coating degradation and have remedied the problem in accordance with the present invention in order to provide a protective coating exhibiting thermal and environmental barrier properties suitable for high temperature applications.

SUMMARY OF THE INVENTION

The present invention selectively utilizes a mixture of porous particles having closed porosity and substantially solid ceramic particles to form an improved slurry formulation. The slurry solidifies in a cured state to form a resultant structure having a controlled distribution of closed pores. The closed porosity is substantially non-collapsing and possesses a sufficiently low thermal conductivity. In this way, the thermal barrier coating that is formed is suitable for high temperature applications. The controlled distribution and size of the closed pores also allows for the production of improved environmental barrier coatings.

In a first aspect, an aqueous slurry composition for production of a porous thermal barrier or environmental coating on a ceramic or metal substrate is provided. A first powder comprising an oxide material with a thermal conductivity lower than about 5 W/m K is provided. The first powder is characterized as coarse particles having a first median size ranging from about 5 microns to about 60 microns, with at least a portion of the coarse particles having a closed porosity that is temperature resistant and substantially impermeable to gas and liquid. A second powder is provided comprising an oxide material with a thermal conductivity lower than about 5 W/m K. The second powder is characterized as fine particles having a second median size ranging from about 0.1 to about 5 microns, wherein the second median size is at least about 5 times smaller than the first median size of the first powder. The coarse particles of the first powder and the fine particles of the second powder form a bimodal particle size distribution in the slurry. A plurality of elemental Boron particles is also provided in an effective amount. An inorganic binder suspending at least a portion of the plurality of elemental Boron particles, the coarse particles and the fine particles in aqueous media is provided. The closed porosity of the coarse particles is temperature resistant and imparts a non-collapsing closed porous structure to the coating.

In a second aspect, a slurry composition for the production of a thermal or environmental barrier coating is provided. A first ceramic material is provided comprising oxide-based particles having a first median particle size ranging from about 5 microns to about 60 microns, the particles being temperature resistant and substantially impermeable to gas and liquid. A second ceramic material is provided comprising oxide-based particles that are substantially solid. The substantially solid particles have a second median particle size ranging from about 0.1 to about 5 microns. A binder is also provided in combination with at least a portion of the first and the second materials in relative proportions to form a bimodal particle distribution. When in a cured state, the closed porosity of the first ceramic material provides a non-degrading, high temperature stable porous structure to the produced thermal barrier coating.

In a third aspect, a thermal or environmental barrier coating is provided. A glass-ceramic matrix is provided. The matrix is formed by a binder and a fine fraction of powder particles. The particles have a first median particle size. A plurality of particles have a closed porosity that is non-collapsing at elevated temperatures of at least about 1000° C. and substantially impermeable to gas and liquid. The plurality of closed porosity containing particles have a second median particle size that is substantially non-overlapping with the first median particle size to form a bimodal particle distribution. The second median particle size is at least about five times larger than the first median particle size. The plurality of closed porosity containing particles are dispersed in the glass-ceramic matrix in an effective amount to lower a thermal conductivity of the coating to about 2 W/m K or lower.

In a fourth aspect, a method for the production of an aqueous slurry is provided. An aqueous binder solution is provided in which a first powder and a second powder are introduced therein. Each of the first and the second powders comprise oxide materials with a thermal conductivity of not higher than about 5 W/m K. The first powder is composed of a first plurality of particles comprising closed porosity of no less than 4 percent, preferably no less than 14 percent and having a median particle size in the range of about 10 micron to about 60 micron, and the second powder is composed of a second plurality of dense particles with a median particle size in the range of about 0.1 micron to about 5.0 micron. A bimodal particle size distribution comprising the first plurality of particles and the second plurality of dense particles is formed. Additionally, elemental Boron is introduced. The first and the second powders and the elemental Boron with the aqueous binder are mixed to form a particle suspension in the aqueous binder solution.

In a fifth aspect, a method for applying a thermal or a environmental barrier coating with an aqueous slurry is provided. An aqueous slurry is provided. The aqueous slurry comprises a first ceramic powder comprising particles having closed porosity and a first median particle size between about 10 micron to about 60 micron; a second ceramic powder comprising dense particles with a second median particle size between about 0.1 micron to about 5 micron; whereby the first and the second powders form a bimodal particle size distribution. elemental Boron and an aqueous, substantially inorganic binder. The aqueous slurry is applied onto a surface of a substrate, and then cured into the coating.

BRIEF DESCRIPTION OF THE DRAWINGS

The objectives and advantages of the invention will be better understood from the following detailed description of the preferred embodiments thereof in connection with the accompanying figures wherein like numbers denote same features throughout and wherein:

FIG. 1 shows a ceramic oxide powder with closed porosity of a hollow microspherical structure (designated as Type A);

FIG. 2 shows a ceramic oxide powder with a closed porosity structure having multiple submicron and nano-sized pores (designated as Type B);

DETAILED DESCRIPTION OF THE INVENTION

Figure 3:
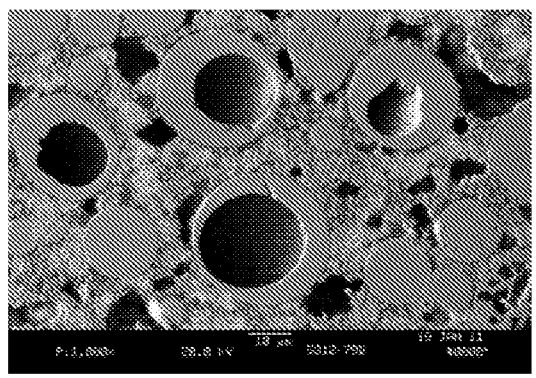
FIG. 3 shows cross-section SEM of a TBC slurry coating as deposited, cured and heat treated onto a substrate incorporating the principles of the invention.

The relationship and functioning of the various elements of this invention are better understood by the following detailed description. However, the embodiments of this invention as described below are by way of example only.

A slurry formulation for production of a coating in accordance with one aspect of the present invention comprises at least two powders of materials with thermal conductivity of lower than about 5 W/m K that are dispersed in an inorganic binder and form a bimodal particle size distribution with fine powder particles being combined with coarse powder particles, wherein these coarse particles are porous with closed porosity. The respective median particle sizes of the coarse and the fine fractions of the created bimodal particle size distribution are selected so that the median particle size of the coarse fraction is at least five times larger than the median particle size of the fine fraction. In a preferred embodiment, the combination of the coarse and the fine fractions in particular proportions with a binder in the slurry has a synergistic effect for producing a coating with low thermal conductivity of about 2 W/m K or lower and an improved thermodynamically stable porosity that exhibits superior temperature resistance and non-degradation at high temperature conditions. It should be understood that the term "coating" is used herein and throughout the specification interchangeably with the term "layer" or "film" and is intended to generally encompass materials that are either free-standing or which cover a desired area along a surface. The term "coating" is not limited by size. In other words, the covered area created by the coating can be as large as an entire surface of, for example, a substrate or only a portion thereof.

The powders that may be utilized include any suitable powder of a material with a thermal conductivity lower than about 5 W/m K, such as for example, a ceramic oxide powder. In one example, the ceramic oxide powder is zirconia. The zirconia powder is preferably chemically stabilized by various materials, such as yttria, calcia or magnesia, or mixtures of any of those materials. Most preferably, yttria-stabilized zirconia (YSZ) is utilized as the powder of both the coarse fraction and the fine fraction.

The YSZ powders may contain about 1 wt % to about 14 wt % yttria, based on the total weight of the powder. Preferably, the YSZ powder may contain about 4 wt % to about 10 wt % yttria, and more preferably from about 7 wt % to about 8 wt % yttria.

Various types of closed porosity structures of coarse powder fraction particles are contemplated in the present invention. "Closed porosity" as used herein refers to a pore that is essentially a standalone pore, which is not interconnected to other pores so as to allow gases or liquid to substantially permeate therethrough. The closed pore structure may be present in individual particles. Alternatively, the closed porosity may occur as a result of an agglomeration of several particles packed together to create interstitial space therebetween and enclosed by an outer continuous boundary.

In one example, the closed porosity may include a hollow spherical morphology. FIG. 1 shows an example of YSZ coarse particles in a powder designated as a Type A. The YSZ particles exhibit a particular type of hollow spherical morphology suitable for the present invention. The size of the particles is on the micron-scale order of magnitude. Accordingly, the particles are considered microparticles. The microparticles of FIG. 1 are designated as having a −325 mesh fraction. The microparticles have an outer shell-like continuous structure. The shell-like structure of each of the microparticles is shown to extend in a continuous manner to define an inner enclosed volume that is hollow. The YSZ chemical composition ranges from about 7 wt % to about 8 wt % $Y_2O_3$-$ZrO_2$. The microspherical powders, as shown in FIG. 1, can be commercially obtained from several sources, such as, for example, Sulzer Metco and Z-TECH LLC. Additionally, methods for forming the spheres known in the art, as disclosed in U.S. Pat. No. 4,450,184 and which is incorporated herein by reference in its entirety, can be utilized to produce the hollow microspheres suitable for the present invention.

Other types of closed porosity containing particles may be employed. FIG. 2 shows an example of YSZ particles in a powder designated as Type B. The YSZ particles are characterized by a different pore size and microstructure than shown in FIG. 1. Specifically, FIG. 2 shows a porous particle having multiple submicron and nanoscale-sized closed pores. The YSZ particles of FIG. 2 are designated as having a −325 mesh fraction. Methods for manufacturing such YSZ particles in which the zirconia has a stabilized tetragonal or cubic structure are disclosed in U.S. Pat. No. 6,703,334 and incorporated herein by reference in its entirety.

Although the pore size and microstructure for each of the powders shown in FIGS. 1 and 2 are different, the overall percentage of closed pores in each of the respective powders is comparable. Table 1 provides a comparison of % closed porosity for Type A and Type B powders with particles sizes in the range from about less than about 20 microns up to about 60 microns. As seen from the data, the % closed pores is rather similar for Type A and Type B when the same particle sizes are being compared.

As further seen from the data, the % closed porosity is drastically reduced for the −635 fraction of the particles which correspond to the particles that are smaller than about 20 microns. Accordingly, the size of the coarse particles employed in the slurries of the present invention is preferably greater than 20 microns with preferably no less than 14% closed porosity, to ensure a sufficient amount of closed pores in the resultant coatings. However, it should be understood that coarse particles having a size below about 20 microns can impart a sufficient amount of closed porosity to carry out the present invention.

TABLE 1

Closed pores in Type A and Type B YSZ powders of coarse fraction in bimodal particle size distribution

| Powder Type | Particle fraction | Closed pores, % |
|---|---|---|
| Type A (FIG. 1) | −325 mesh | 17 |
| $S_a = 0.2$ m$^2$/g | −400 mesh | 14 |
| | −400/+500 mesh | 18 |
| | −635 mesh | 4 |
| Type B (FIG. 2) | −230 mesh | 14 |
| $S_a = 0.4$ m$^2$/g | −325/+400 mesh | 18 |
| | −400/+500 mesh | 14 |
| | −635 mesh | 5 |

Because the overall amount of closed pores in both types of the powders is substantially similar, either powder would be suitable for combination with the fine powder fraction to create the specific bimodal particle size distribution despite potential differences in the respective pore size and distributions of the powders. Employing the closed porosity containing particles as the coarse fraction in the slurries of the present invention exhibits several favorable properties to the slurries and the TBCs produced therefrom. "TBCs" as used herein refer to coatings that can reduce heat flow into the underlying substrate. The closed porosity particles reduce thermal conductivity and thus enhance thermal barrier properties of a thermal insulating layer, as compared to a layer composed of completely solid particles of the same material. Additionally, the TBCs produced by the slurries of the present invention are thermodynamically stable and are characterized by a specifically designed "built-in" porosity that is temperature-resistant and non-degrading when exposed to the relatively high temperature operating conditions, to which TBCs are typically exposed. Such properties are an improvement to the intrinsic thermal instability of the porous microstructure typical of conventional plasma-sprayed TBC coatings.

The closed porosity containing particles may generally have a median particle size D50 that ranges from about 5 microns to about 60 microns. More preferably, D50 of the coarse fraction particles is from about 20 microns to about 50 microns.

It should be understood that the hollow microspheres of FIG. 1 and the submicron and nanoscale-sized closed porosity particles of FIG. 2 are illustrative examples of closed porosity containing materials suitable for the present invention. Other types of powders with closed porosity containing particles exhibiting the above described properties are contemplated by the present invention. By way of example, individually containing closed porosity particles which are non-spherically shaped may be utilized in the inventive slurry.

Figure 4:
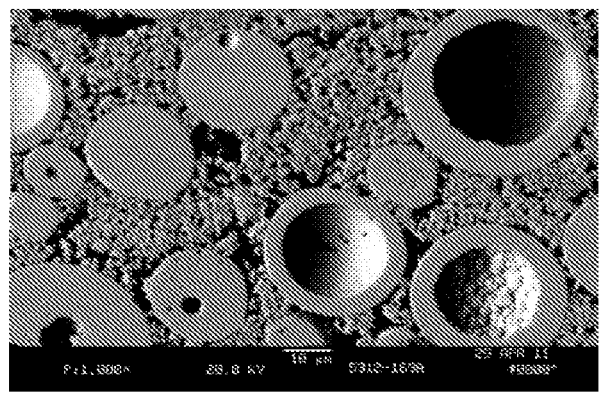
FIG. 4 shows cross-section SEM of a TBC slurry coating as deposited onto a substrate incorporating the principles of the invention and thereafter cured to form a free-standing coating that was heat treated.

The closed-porosity containing coarse particles in the coatings derived from the slurries of the present invention can be embedded into, encapsulated within, enclosed therein, or otherwise adhered into a coating matrix. FIGS. 3 and 4 show SEM data for some coatings derived from the slurries of the present invention: as seen from the data, the closed-porosity containing coarse particles of Type A are incorporated into the coating matrix to form the closed porous structure. The coating matrix, as shown in FIGS. 3 and 4, is formed by a binder with a fine powder fraction dispersed therein. The formation of the coating matrix provides the necessary mechanical strength to the coating, along with its adhesion to the substrate. Densification of the coating matrix formed by a suitable binder with the fine powder fraction under high temperature exposure results in the formation of a glass-ceramic matrix composite structure suitable for the present invention.

The fine fraction is significantly smaller in particle size than the coarse fraction of closed porosity containing particles by at least five times and may have a median particle size D50 that ranges from about 0.1 microns to about 5.0 microns. Preferably, D50 ranges from about 1.0 to about 4.0 microns. The surface area of the fine powder may be less than about 5 m$^2$/g.

Preferably, the fine particle fraction is also composed of a ceramic oxide powder. Preferably, the ceramic oxide powder is a zirconia-based powder that is chemically stabilized with a predetermined amount of yttria. However, as with the coarse material, it should be noted that the present invention contemplates other stabilizing agents, such as, for example, calcia or magnesia. Additionally, the fine fraction may also be composed of other types of oxide-based materials that have low thermal conductivity. For example, in one embodiment of the present invention, the fine fraction may have a pyrochlore-type crystal structure represented by the formula $Ln_2M_2O_7$, wherein M is Zr, Ce, and/or Hf, and Ln is La, Gd, Sm, Nd, Eu and/or Yb. The fine oxide particles may also comprise a mixture of oxide compounds having a perovskite-type crystal structure represented by the formula AMO3, where M is Zr or Ti and A is an alkali earth element, rare earth element or any combination thereof. Alternatively, the mixture of oxide compounds can include aluminates of rare earth metals.

In accordance with an embodiment of the present invention, the slurries comprise a powder of a fine particle fraction and a powder of a coarse particle fraction. The powders may be mixed in various relative proportions. For instance, the coarse powder can comprise from about 30 wt. % to about 60 wt. % of the slurry composition, and both powders in combination can comprise at least about 55 wt. % to about 85 wt. % of the slurry composition. In some embodiments, when both coarse and fine fractions are YSZ particles, the coarse fraction of closed-porosity particles comprises from about 35% to about 55% by weight, and the ratio of the fine fraction to the coarse fraction powder is in the range from about 1:1 up to about 1:2.5 by weight. Preferably, this ratio can range from about 1:1.8 up to about 1:2.2 by weight, and the total YSZ powder content comprises between 60% to 80% by weight of the aqueous slurry composition.

An inorganic binder in the slurry formulation of the present invention may include any suitable material that, upon coating cure, provides a matrix which functions to facilitate receiving and holding the powders therewithin. The binder may interact with the fine powder fraction (e.g., YSZ fine fraction) in a cured state and under high temperature service conditions to form a glass-ceramic matrix with adequate particle packing and mechanical strength. Examples of suitable binders include water solutions of alkali metal silicates, metal phosphates or combinations thereof. In one embodiment, the aqueous binder is a solution of Na silicate and/or K silicate. Preferably, sodium silicate with a relatively high weight ratio of SiO2/Na2O, such as higher than 2.5, is selected to provide relatively faster drying of a sprayed coat and sufficient mechanical strength to a cured coating. In some examples, the binder is a Na silicate binder with a SiO2/M2O ratio higher than about 3.0.

The content of the binder may range from about 15 wt % to about 45 wt % total coating. Preferably, the binder and total YSZ powders are present in an amount of about 25 wt % binder-75 wt % total YSZ powder. Alternatively, the binder and total YSZ powders are present in an amount of 30 wt % binder-70 wt % total YSZ powder.

Elemental Boron may also be included in the slurry formulation, preferably in the amount from 0.2 to 2.0 wt. %, and more preferably in the amount from about 0.5 up to 1.5 wt. %. It was discovered in the present invention that employing Boron in the slurries provides a surprising improvement in high temperature adhesion of the coating to stainless and superalloy substrates, as well as increase in thermal shock resistance of the coating, thus preventing its spallation from a substrate under service conditions.

Various types of additives and dopants may also be incorporated into the slurry formulation to achieve functional properties that are suitably tailored for specific end-use applications. By way of example, one or more additives may be incorporated, which includes anticorrosive pigments, such as phosphates, polyphosphates, polyphosphate-silicates of aluminum, strontium, zinc, molybdenum and combinations thereof. Additionally, viscosity modifiers such as magnesium aluminum silicate clays may be incorporated into the slurry.

Figure 5:
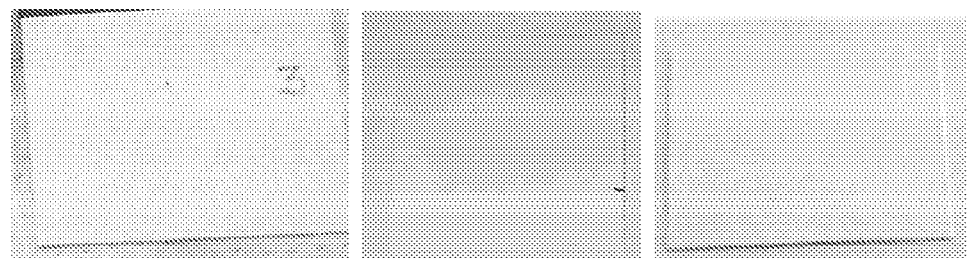
FIG. 5 shows free standing TBCs after being subject to various heat treatments.

The coatings of the present invention are heat resistant. As an example shown in FIG. 5, the free-standing YSZ coatings exhibit high structural integrity under prolonged exposure to high temperatures, such as at 1200 C for 100 hours.

Figure 6:
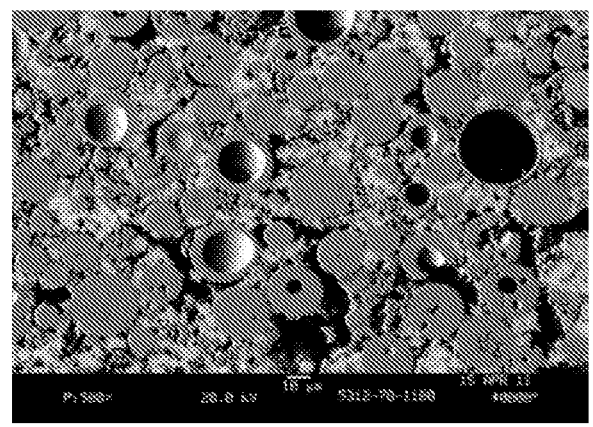
FIG. 6 shows cross-section SEM of a TBC coating in accordance with the principles of the present invention that was subject to a heat treatment of 1100 C for 100 hrs.
Figure 7:
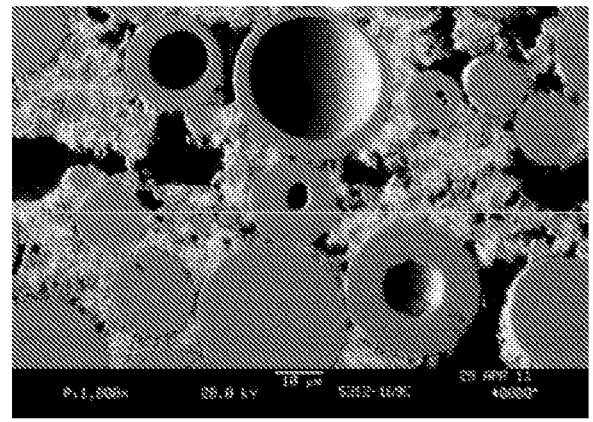
FIG. 7 shows cross-section SEM of a TBC coating in accordance with the principles of the present invention that was subject to a heat treatment of 1200 C for 100 hrs.
Figure 8:
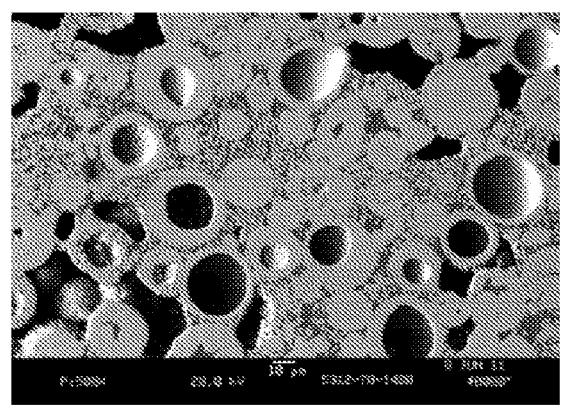
FIG. 8 shows cross-section SEM of a TBC coating in accordance with the principles of the present invention that was subject to a heat treatment of 1400 C for 100 hrs.

The microstructure of the coatings of the present invention remain intact after heat treatments. FIGS. 6 and 7 present cross-section SEM data for the YSZ coating after heat treatments of 1100 C for 100 hrs and 1200 C for 100 hrs, respectively. Furthermore, FIG. 8 indicates an absence of substantial thermal deterioration of the coating microstructure, as well as of the closed pore structure of the employed YSZ hollow spheres when exposed to an elevated temperature of 1400 C for a time of 100 hrs. Some sintering of the microspheres outer shell can be observed, but, advantageously, a majority of the microspheres do not collapse, thus preserving intact the inner holes and providing temperature stable, non-degrading closed porosity of the resultant TBC coating. Advantageously, the inventive closed porous structures, as shown in these Figures, have the ability to remain intact without exhibiting significant collapsing or thermal degradation of the closed porous structure.

Figure 9:
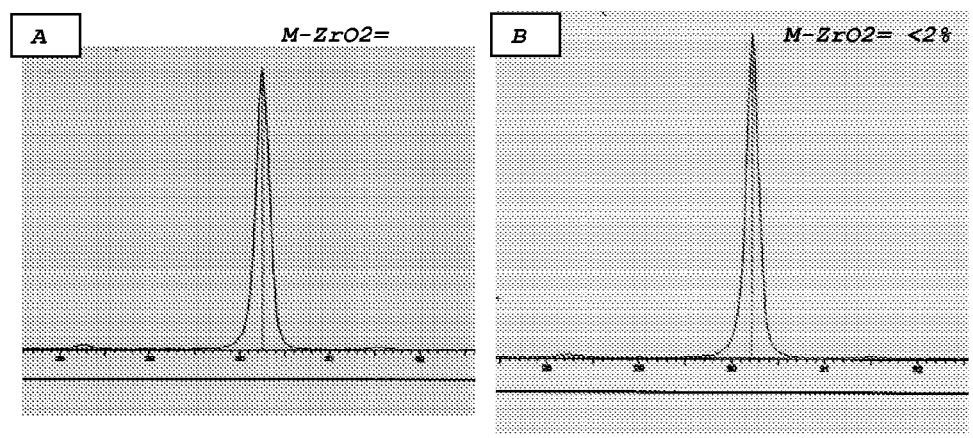
FIG. 9 shows X-ray diffraction (XRD) data for YSZ closed porosity particles as is and when exposed to 1350 C for 4 hrs.

YSZ-based coatings of the present invention exhibit high thermal stability of their phase composition, as confirmed by X-ray diffraction data (XRD). In particular, substantially no phase transformation of the Zr(Y)O2 tetragonal structure to the M-ZrO2 monoclinic structure occurs. In particular, high temperature exposure does not cause any phase transformation of YSZ closed porosity particles. As an example, FIG. 9 shows the high thermal stability of the phase composition of YSZ hollow spheres employed in the coatings of the present invention (Type A powder, particles size of less than about 37 micron in size) when exposed to an elevated temperature of 1350 C for 4 hours: no phase transformation of Zr(Y)O2 tetragonal to the deleterious monoclinic phase (M-ZrO2) occurs. The absence of the M-ZrO2 structure may be an indication that the adverse effects of sintering, which typically can occur at elevated temperatures, are substantially reduced or eliminated. Eliminating said phase transformation can improve coating performance and prolong a TBCs life in high temperature demanding applications, such as aerospace and land-based gas turbine engines.

Thus, as confirmed by SEM and XRD data, the YSZ closed porosity particles are generally temperature resistant. Accordingly, the particles provide a barrier to heat transfer into the coating. When incorporated into a slurry, the YSZ closed porosity particles can provide an accumulation of closed porosity that is "built-in" and distributed within the coating that is produced from the slurry. Such a specifically designed accumulation of thermally stable closed porosity contained within the coating provides protection against thermal degradation of the coating. As a result, the thermal conductivity of the TBC coatings of the present invention can be maintained at about 2 W/m K or lower.

The thermal conductivity of the coatings applied to low-steel substrates employing the slurries of the present invention, was determined using the laser flash techniques in the temperature range from room temperature up to 900 C. It was found out that the coatings of the present invention when derived from the preferable slurry formulations, provided the thermal conductivity of about 1 W/m K and lower.

Thus, exposure to high temperatures for prolonged periods of time, as customary in several aerospace and land-based gas turbine engine applications, does not significantly structurally degrade the closed porosity. Further, the structural integrity of the grain boundaries enclosing the closed porous structure allows the coarse material to serve as a substantial barrier to gas and liquid permeation.

The combination of the coarser powder having a closed porous structure with the fine powders to form a unique bimodal particle distribution provides a synergistic effect. In particular, a thermodynamically stable closed porosity structure to the resultant coating is produced. The combination of the two sets of powder particles produces a controlled amount of closed porosity, which imparts desirable properties to the resultant cured coating. Because the closed porous particles do not degrade and collapse under high temperature conditions, they impart a temperature resistant, non-collapsing closed porosity to the resultant coating when subject to elevated temperatures for prolonged periods of time. The solid finer particles are interdispersed within the binder to provide sufficient mechanical strength. The difference in median particle size distributions between the coarse and the finer fraction enables sufficient particle packing to produce a relatively high bulk density. Accordingly, these features collectively allow the structural integrity of the coating to withstand high operating temperature environments for a prolonged time, thereby enhancing the thermal barrier properties of the coating.

The slurries of the present invention are also suitable for the production of environmental barrier coatings (hereafter, referred to as "EBCs"). "EBCs" as used herein and throughout the specification refer to coatings that can substantially prevent the passage of the contaminants of concern (e.g., air, oxygen, hydrogen, organic vapors, moisture) as well as substantially prevent chemical and physical attack caused by high temperature, aqueous and corrosive environments to which the EBCs are typically exposed. By virtue of its impermeability, the EBC can function as a protective and passivating coating or layer or film that can inhibit oxidation, corrosion and erosion when exposed to a variety of high temperature and demanding operating conditions. The EBC also creates a nonreactive barrier that is chemically inert to the constituents contained in such environments.

It was surprisingly discovered that incorporating elemental Boron into the slurries of the present invention resulted in a significant increase in corrosion protection provided by the coatings derived from these slurries. As an example, low-carbon steel panels (1010 steel) coated with about 250 micron thick coating of the present invention that contained Boron have been tested in a Salt spray cabinet in accordance with ASTM Standard B117 for 2000 hrs. The tests revealed a noticeable absence of any induced development of red rust, thereby validating the coating's environmental barrier protection against corrosion.

Additional testing indicated that high temperature exposure of the EBCs within an oxidizing rich atmosphere produced no visible formation of oxide scale on the metal substrate, thereby substantiating EBCs superior barrier protection against oxidation.

The TBCs and EBCs of the present invention have several advantages. For example, the coatings can be applied onto various substrate components by well-established techniques such as spray paint, dipping, dip-spin and brush-on techniques. The coatings may also be applied onto complex geometries employing non-line-of-sight techniques. Further, due to strong protection of a substrate from oxidation and corrosion provided by the TBCs of the present invention, for some substrate types and applications there is no need to employ a bond layer onto the substrate surface. If a bond layer is selected to be employed, the bond layer may be, such as plasma sprayed MCrAlY coating or diffusion aluminide, as well as slurry-based MCrAlY coating. Another advantage of the inventive slurry formulation is its versatility, such that various additives and dopants may be readily incorporated therein for specific applications without adversely affecting the barrier performance properties or the structural integrity of the closed porous structure.

While it has been shown and described what is considered to be certain embodiments of the invention, it will, of course, be understood that various modifications and changes in form or detail can readily be made without departing from the spirit and scope of the invention. It is, therefore, intended that this invention not be limited to the exact form and detail herein shown and described, nor to anything less than the whole of the invention herein disclosed and hereinafter claimed.

The invention claimed is:
1. An aqueous slurry composition for production of a porous thermal or environmental barrier coating on a metallic or a ceramic substrate, comprising:
    a first powder comprising an oxide material with a thermal conductivity lower than about 5 W/m K, coarse particles having a first median size ranging from about 5 microns to about 60 microns, with at least a portion of the coarse particles having a closed porosity that is temperature resistant and substantially impermeable to gas and liquid;
    a second powder comprising an oxide material with a thermal conductivity lower than about 5 W/m K, the second powder characterized as fine particles having a second median size ranging from about 0.1 to about 5 microns, wherein the second median size is at least about 5 times smaller than the first median size of the first powder, whereby the coarse particles of the first powder and the fine particles of the second powder form a bimodal particle size distribution in the slurry;
    a plurality of elemental Boron particles provided in an effective amount, wherein said elemental Boron is contained in an amount from 0.2 to 2.0 weight %; and
    an inorganic binder suspending at least a portion of the plurality of elemental Boron particles, the coarse particles and the fine particles in an aqueous solution;

wherein the closed porosity of the coarse particles is temperature resistant and imparts a non-collapsing closed porous structure to the coating.

2. The aqueous slurry composition of claim 1, the first median particle size ranging from about 20 microns to about 50 microns, and the second median particle size ranging from about 1.0 micron to about 4.0 microns, wherein the closed porosity of the coarse particles is no less than 14 percent.

3. The aqueous slurry composition of claim 1, the first median particle size ranging from about 20 microns to about 50 microns, and the second median particle size ranging from about 1.0 micron to about 4.0 microns, wherein the coarse and the fine particles are composed of yttria-stabilized zirconia.

4. The aqueous slurry composition of claim 1, wherein the coarse particles and the fine particles are composed of yttria stabilized zirconia, calcia stabilized zirconia, magnesia stabilized zirconia or mixtures thereof.

5. The aqueous slurry composition of claim 1, wherein the first powder comprises from about 30 wt. % to about 60 wt. % of the aqueous slurry composition, and the first and the second powders in combination comprise a total of at least 55 wt. % up to about 85 wt. % of the aqueous slurry composition.

6. The aqueous slurry composition of claim 1, wherein the binder is selected from the group consisting of a metal silicate binder or a metal phosphate binder.

7. The aqueous slurry composition of claim 6, wherein the binder is a metal silicate binder with a SiO2/M2O ratio higher than about 2.5, wherein M is a metal selected from Na, K and Li or a combination thereof.

8. The aqueous slurry composition of claim 6, wherein the binder is a metal phosphate binder with a P2O5/M ratio of not less than 0.1, wherein M is a metal selected from Group I, II, III or IV of Periodic Chart of Elements or a combination thereof.

9. The aqueous slurry composition of claim 1, further comprising an anticorrosive pigment, a viscosity modifier or a combination thereof.

10. The aqueous slurry composition of claim 1, wherein the fine oxide particles comprise a mixture of oxide compound with a median particle size distribution ranging from about 0.1 microns to about 5 microns, the mixture of the oxide compounds having a pyrochlore-type crystal structure represented by the formula $Ln_2M_2O_7$, wherein M is Zr, Ce, and/or Hf; and Ln is La, Gd, Sm, Nd, Eu, Yb or any combination thereof.

11. The aqueous slurry composition of claim 1, wherein the fine oxide particles comprise a mixture of oxide compounds having a perovskite-type crystal structure represented by the formula AMO3, and wherein M is Zr and/or Ti;

A is an alkali earth element, rare earth element or any combination thereof.

12. The aqueous slurry composition of claim 1, wherein the fine oxide particles are a mixture of oxide compounds comprising aluminates of rare earth metals.

13. The aqueous slurry composition of claim 3, the first powder and the second powder comprise yttria stabilized zirconia, the binder selected from the group consisting of an alkali metal silicate binder and metal phosphate binder, wherein said first powder comprises from 35% to 55% by weight, ratio of the second powder to the first powder is in the range from about 1:1 up to about 1:2.5 by weight, and the first and the second powders combined comprise between about 60% to about 80% by weight of the aqueous slurry composition.

* * * * *